United States Patent
Sugimura

[19]

[11] Patent Number: 6,062,779
[45] Date of Patent: May 16, 2000

[54] TOOL ATTACHING/DETACHING DEVICE

[75] Inventor: Tetsuo Sugimura, Futtsu, Japan

[73] Assignee: Kuroda Seiko Co., Ltd., Chiba, Japan

[21] Appl. No.: 09/051,951

[22] PCT Filed: Aug. 25, 1997

[86] PCT No.: PCT/JP97/02933

§ 371 Date: Apr. 21, 1998

§ 102(e) Date: Apr. 21, 1998

[87] PCT Pub. No.: WO98/08641

PCT Pub. Date: Mar. 5, 1998

[30] Foreign Application Priority Data

Aug. 26, 1996 [JP] Japan ..................................... 8-242608

[51] Int. Cl.$^7$ .................................................. B23C 1/00
[52] U.S. Cl. .............................. 409/232; 279/75; 279/91; 279/904; 408/239 A; 409/234
[58] Field of Search .................... 409/230, 231, 409/232, 234; 408/238, 239 R, 239 A, 240; 279/75, 89, 91, 141, 146, 904, 905

[56] References Cited

U.S. PATENT DOCUMENTS

| | | | |
|---|---|---|---|
| 3,671,050 | 6/1972 | Andersson et al. ...................... | 409/232 |
| 4,502,824 | 3/1985 | Dohse et al. ............................. | 409/234 |
| 4,673,319 | 6/1987 | Ishikawa .................................. | 409/234 |
| 4,710,079 | 12/1987 | Smith et al. ............................. | 409/234 |
| 4,795,291 | 1/1989 | March ..................................... | 409/131 |
| 5,352,074 | 10/1994 | Ishikawa ................................. | 409/232 |
| 5,372,465 | 12/1994 | Smith ...................................... | 409/232 |
| 5,833,405 | 11/1998 | Nielsen ................................... | 408/240 |

FOREIGN PATENT DOCUMENTS

7-266109  10/1995  Japan ....................................... 31/113

*Primary Examiner*—Daniel W. Howell
*Assistant Examiner*—Christopher Kirkman
*Attorney, Agent, or Firm*—Leydig, Voit & Mayer, Ltd

[57] ABSTRACT

Upper-and-lower cutouts (25*a*) and right-and-left cutouts are formed in a flange portion (23) of a holder main body (12). In a fore portion of the outer circumference of the flange portion (23), is provided a first operation ring (41), which is urged rearward by a compression spring (42). A taper portion (44) inwardly slanted as viewed toward the rear as well as a straight portion (45) are formed in the operation ring (41), and a drive key portion to be fitted to the key way of the spindle through the right-and-left cutouts are provided on both right and left sides of a rear face (45*a*) of the straight portion (45). In the rear of the operation ring (41), is provided a second operation ring (51) via two spacers (52). Engaging claws (54) to be engaged with an engaging portion of the spindle are provided in a rear portion of the inner surface of the operation ring (51), and a taper portion (57) inwardly slanted as viewed toward the front is provided in a fore portion of the inner surface of the operation ring (51). The operation ring (51) and the spacers (52) are coupled to each other by first steel balls (55), and a multiplicity of second steel balls (58) are arranged between the taper portion (44), the spacers (52) and the taper portion (57).

14 Claims, 7 Drawing Sheets

Prior Art

TOOL ATTACHING/DETACHING DEVICE

TECHNICAL FIELD

The present invention relates to a tool attaching/detaching device for attaching and detaching a tool to a spindle of a machine tool.

BACKGROUND ART

As this type of tool attaching/detaching device, for example, those shown in Japanese Utility Model Laid-Open Publication SHO 53-144586, Japanese Patent Laid-Open Publication SHO 57-107747, Japanese Patent Laid-Open Publication HEI 6-134608 and the like are conventionally known. The tool attaching/detaching device of Japanese Utility Model Laid-Open Publication SHO 53-144586 is so arranged that the holder main body is tightened -to the spindle by screw. Also, the tool attaching/detaching device of Japanese Patent Laid-Open Publication SHO 57-107747 is designed for improved operability.

Figure 1:
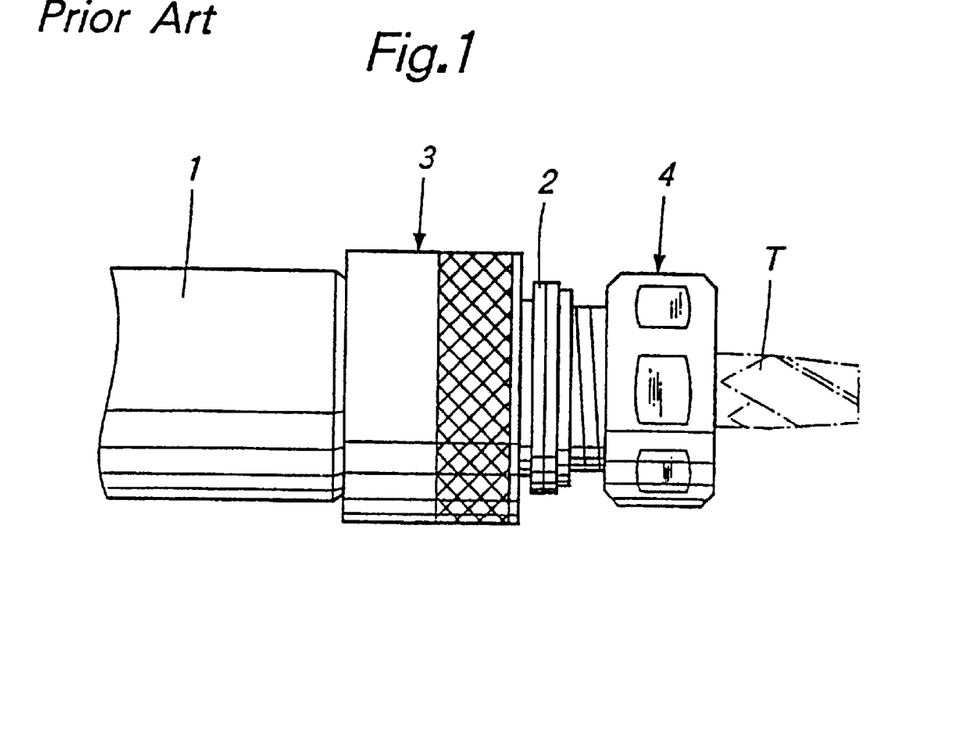
FIG. 1 is a front view of a prior art example.
Figure 2:
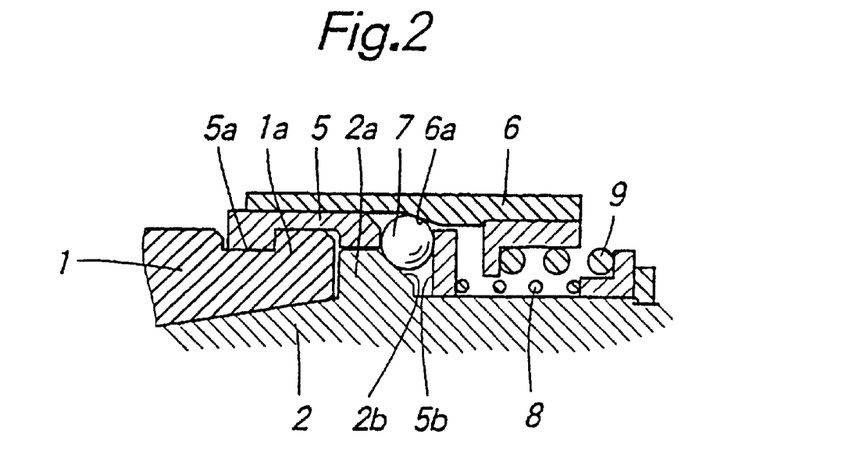
FIG. 2 is a partial sectional view of the prior art example.

In the tool attaching/detaching device of Japanese Patent Laid-Open Publication HEI 6-134608, for example as shown in FIG. 1, a main body 2 is removably mounted to a spindle 1, and the main body 2 is provided with an operation part 3 and a tool fitting part 4. Also as shown in FIG. 2, in the operation part 3, a first annular member 5 having a claw portion 5a is provided on the outer circumference of a flange portion 2a of the main body 1, and a second annular member 6 is provided on the outer circumference of the first annular member 5. A ball 7 is placed between a taper portion 2b of the main body 2, a straight portion 5b of the first annular member 5 and a taper portion 6a of the second annular member 6. The annular members 5, 6 are urged toward the spindle 1 side by compression springs 8, 9, respectively.

As a result of this arrangement, the taper portion 6a of the second annular member 6 pushes in the ball 7 between the taper portion 2b of the main body 2 and the straight portion 5b of the first annular member 5, so that the first annular member 5 is pressed toward a tool T side while the main body 2 is pressed toward the spindle 1 side. This causes the flange portion 2a of the main body 2 and the claw portion 5a of the first annular member 5 to be brought into close contact with an engaging portion 1a of the spindle 1. Thus, the fixing force for the spindle 1 and the main body 2 is enhanced.

However, out of the aforementioned prior art examples, the tool attaching/detaching device of Japanese Patent Laid-Open Publication SHO 57-107747, indeed capable of improving the operability over the tool attaching/detaching device of Japanese Utility Model Laid-Open Publication SHO 53-144586, but is deteriorated in axial withstand-load characteristic below the tool attaching/detaching device of Japanese Utility Model Laid-Open Publication SHO 53-144586. As a result, the tool attaching/detaching device has a problem that when a tensile force is applied to the main body, axial dimensional precision with respect to the work to be machined would be unstable, or high-frequency vibrations would occur to the main body, or the machine spindle and the main body would easily wear out.

Also, in the tool attaching/detaching device of Japanese Patent Laid-Open Publication HEI 6-134608, because the main body 2 is mounted on the spindle 1 necessarily by holding the tool fitting portion 4 and pushing in the main body 2, there is a possibility that the tool T fitted to the tool fitting portion 4 makes a danger. Further, because the rotation of the main body 2 causes centrifugal force to be applied to the ball 7, the pressing force of the ball 7 against the taper portion 2b of the main body 2 is reduced so that the force with which the flange portion 2a of the main body 2 and the claw portion 5a of the first annular member 5 are in contact with the engaging portion 1a of the spindle 1 is weakened. As a result, there is a possibility that the main body 2 may shift axially.

An object of the present invention is to provide a tool attaching/detaching device which solves the foregoing problems and which is capable of mounting the holder main body to the spindle easily, safely and firmly.

DISCLOSURE OF THE INVENTION

The present invention provides a tool attaching/detaching device comprising: a holder main body for holding a tool in a fore portion thereof and fitting to a fitting hole in a rear portion thereof, with a flange portion formed in an intermediate portion thereof; a first operation ring slidably provided on an outer circumference in front of the flange portion; a second operation ring provided on an outer circumference of the first operation ring via a spacer and having an engaging claw to be engaged with an engaging portion of a machine spindle; and urging means for urging the first operation ring rearward, the tool attaching/detaching device being characterized in that: the flange portion has upper-and-lower cutouts and right-and-left cutouts formed therein; a first taper portion inwardly slanted, as viewed toward the rear, is provided in a rear portion of the first operation ring; a key portion to be fitted to a key way of the machine spindle by passing through the right-and-left cutouts is provided in a rear portion of the first taper portion; a front face generally perpendicular to an axial direction is provided in a fore portion of the spacer while protrusions to be fitted to the upper-and-lower cutouts are provided in a rear portion of the spacer; a second taper portion inwardly slanted, as viewed toward the front, is provided in a fore portion of an inner surface of the second operation ring; and a multiplicity of rolling members are arranged between the first taper portion of the first operation ring, the front face of the spacer and the second taper portion of the second operation ring. Since the holder main body can be attached to and detached from the machine spindle by gripping the second operation ring, the operation can be accomplished easily.

BEST MODE FOR CARRYING OUT THE INVENTION

The present invention will now be described in detail based on embodiments as illustrated in FIGS. 3 through 13.

Figure 3:
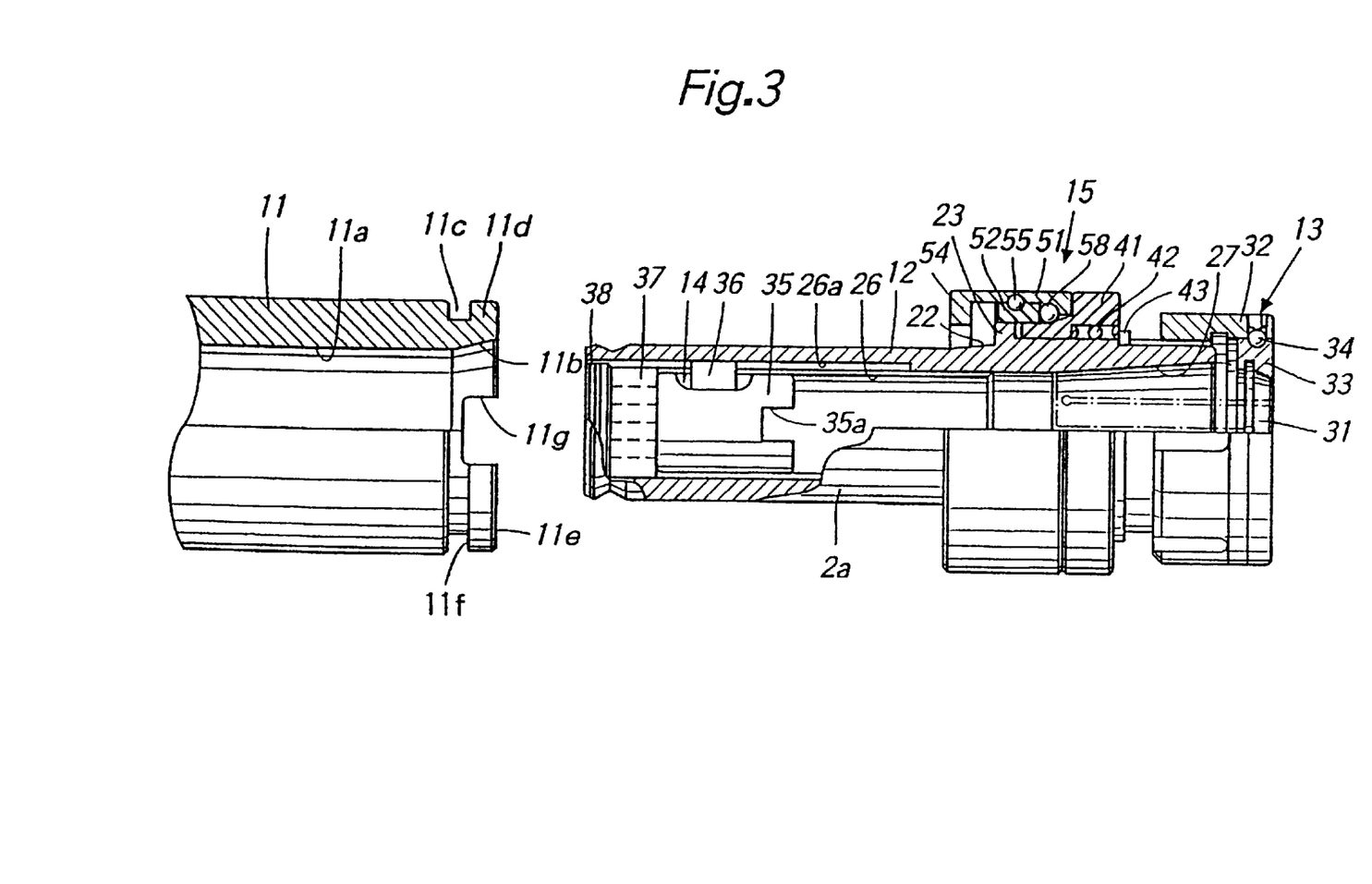
FIG. 3 is a partial sectional view of a first embodiment, shown together with the machine spindle.
Figure 4:
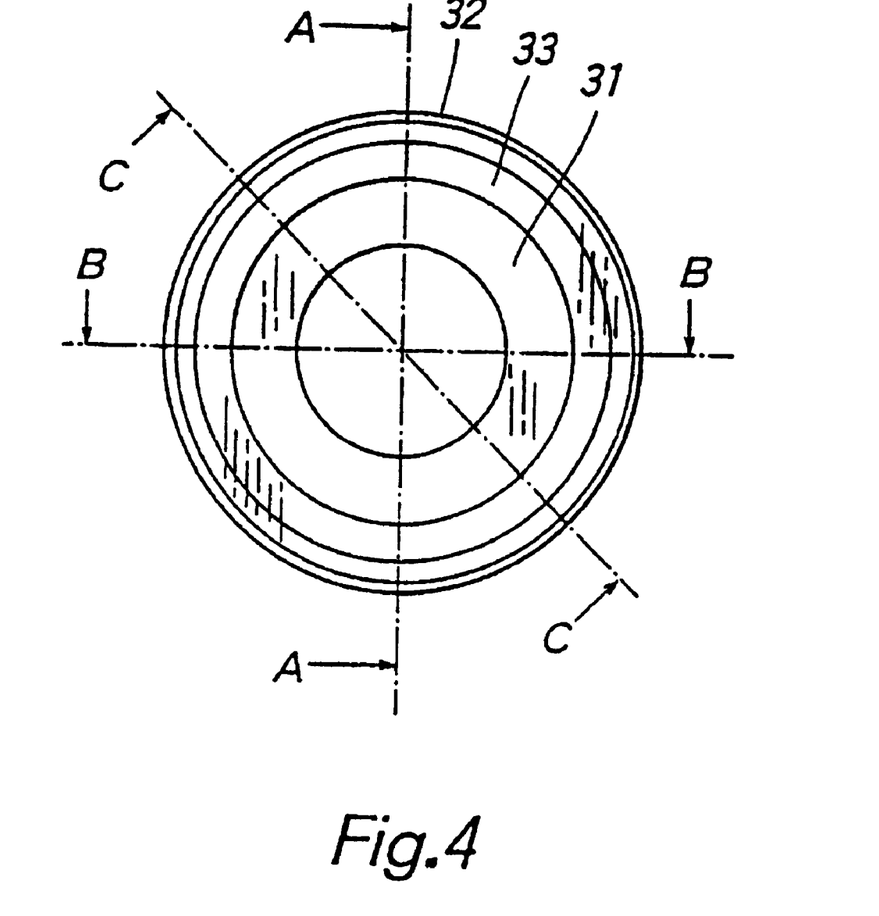
FIG. 4 is a right side view.
Figure 5:
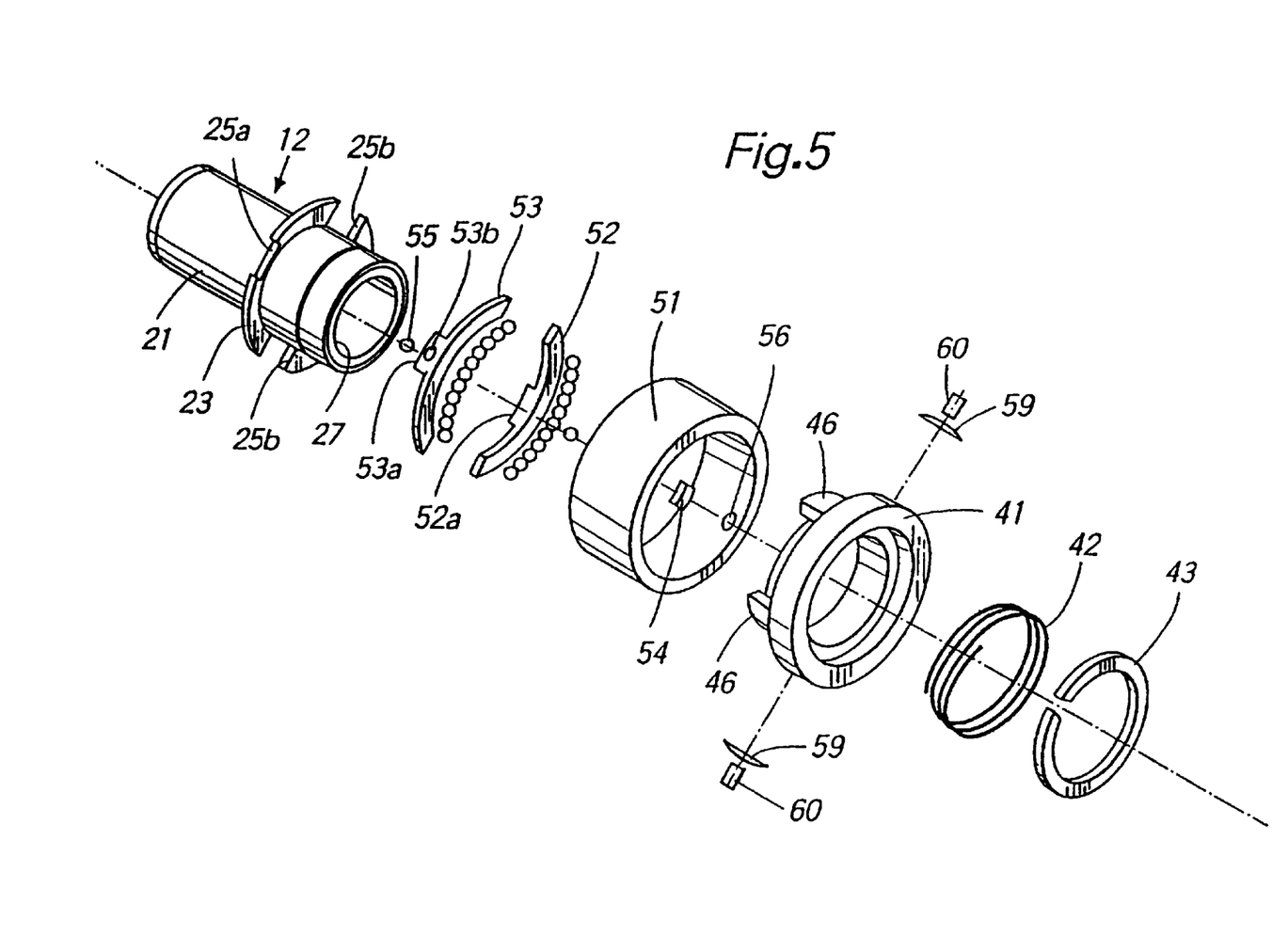
FIG. 5 is an exploded perspective view.

FIG. 3 is a partial sectional view of a first embodiment shown together with a spindle 11 of a machine tool, FIG. 4 is a right-hand side view and FIG. 5 is an exploded perspective view, where a holder main body 12 is attached to and detached from the spindle 11. In a fore portion of the holder main body 12, i.e., on its one side opposite to the spindle 11, is provided a tool attaching/detaching part 13 for attaching and detaching an unshown tool. In a rear portion of the holder main body 12, i.e., on its one side closer to the spindle 11, is provided a tool-length adjusting part 14 for adjusting the projecting length of the tool. At a generally intermediate portion of the holder main body 12, is provided an operation part 15 to be operated for attaching and detaching the holder main body 12 to and from the spindle 11.

At an axial center of the spindle 11, is provided a fitting hole 11a to which the holder main body 12 is fitted, the opening of the fitting hole 11a being formed into a taper hole 11b. An annular groove 11c is formed on an outer circumference of an end portion of the spindle 11, a portion forward of the annular groove 11c being an engaging portion 11d. The front face of the engaging portion 11d is a contact face 11e with which the rear face of a later-described flange portion comes into contact, while the rear face of the engaging portion lid is an engaging face 11f with which a later-described engaging claw is engaged. Then, two key ways 11g are provided on both right and left sides of the engaging portion 11d.

Figure 6:
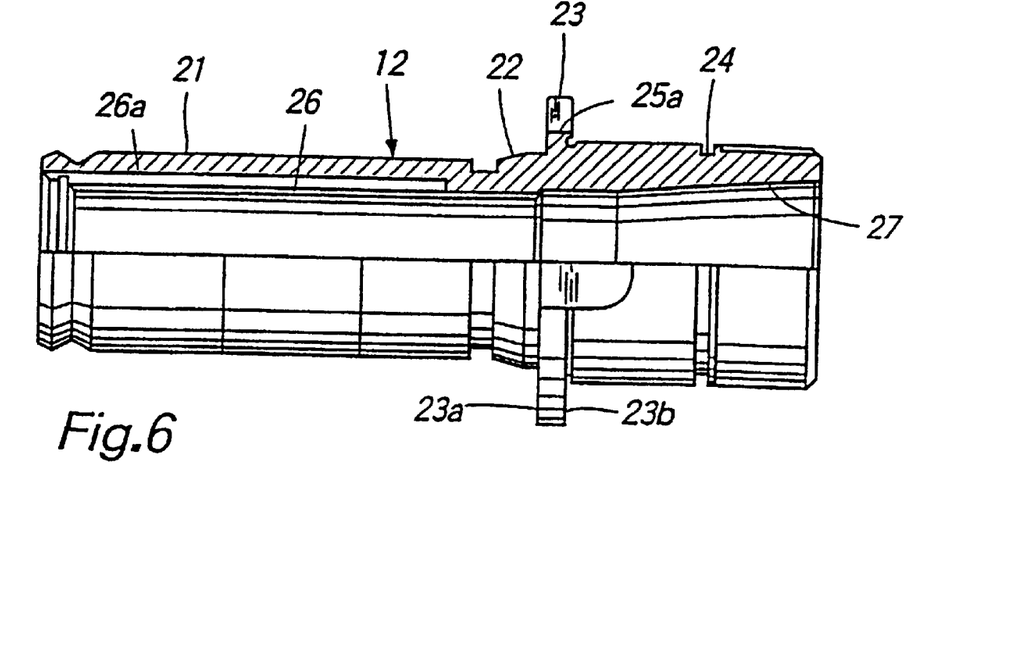
FIG. 6 is a partial sectional view of a holder body.
Figure 7:
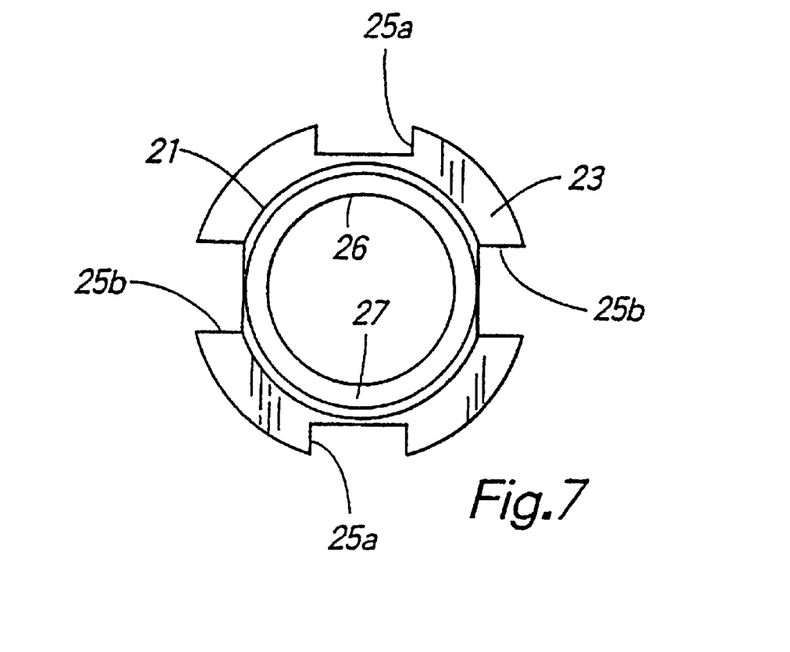
FIG. 7 is a right side view of the holder body.

As shown in FIG. 6, the holder main body 12 comprises a fitting portion 21 to be fitted to the fitting hole 11a of the spindle 11, a taper portion 22 to be fitted to the taper hole 11b of the spindle 11, a flange portion 23 to be brought into contact with the contact face lie of the spindle 11, and a stopper groove 24 to which a later-described stopper is fitted, in this order as viewed from the rear. Providing the taper portion 22 allows the precision against deflection to be improved. The flange portion 23, as shown in FIG. 7, has upper-and-lower two shallow cutouts 25a and right-and-left two deep cutouts 25b. Besides, a straight hole 26 having a longitudinal groove 26a is formed in rear portion of the axial center of the holder main body 12, while a taper hole 27 is provided in front portion.

The axial position of the holder main body 12 is determined by contact between a rear face 23a of the flange portion 23 and the contact face 11e of the spindle 11 or by fit between the taper portion 22 and the taper hole 11b. Accordingly, with the constitution in which the axial position of the holder main body 12 is determined by contact between the rear face 23a of the flange portion 23 and the contact face lie, the taper portion 22 and the taper hole 11b are not required.

The tool attaching/detaching part 13 is implemented by, for example, a collet chuck, where a collet 31 is fitted to the taper hole 27 of the holder main body 12 and a nut 32 is screwed on the outer circumference of the holder main body 12. The collet 31 is coupled to the nut 32 by a coupling ring 33 and a ball 34, and the collet 31 is axially driven by turns of the nut 32 so that a tool such as a drill or an end mill is held to the collet 31.

In the tool-length adjusting part 14, a sliding member 35 is fitted to the straight hole 26, the sliding member 35 being restricted in rotation by a key 36 fitted to the longitudinal groove 26a. A cutout 35a is formed in a fore portion of the sliding member 35, so that the tool is restricted in rotation by its rear end being fitted to the cutout 35a. Besides, a screw 37 and a snap ring 38 are attached in succession behind the straight hole 26 and the sliding member 35.

Figure 8:
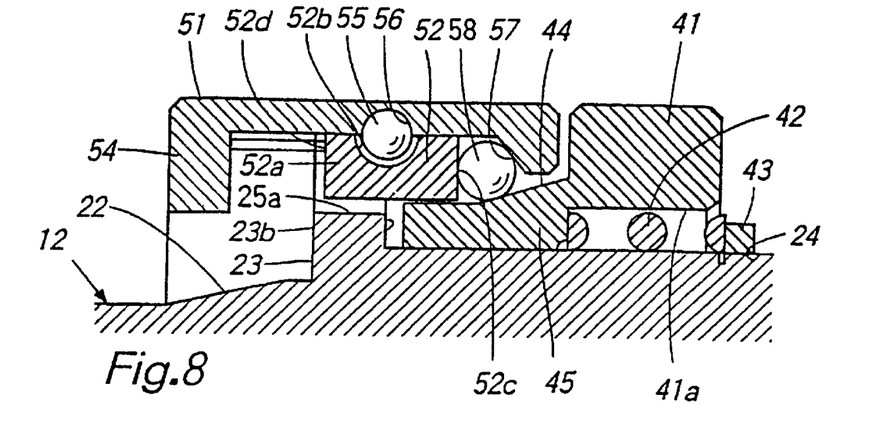
FIG. 8 is a partial sectional view cut along the line A—A of FIG. 4.
Figure 9:
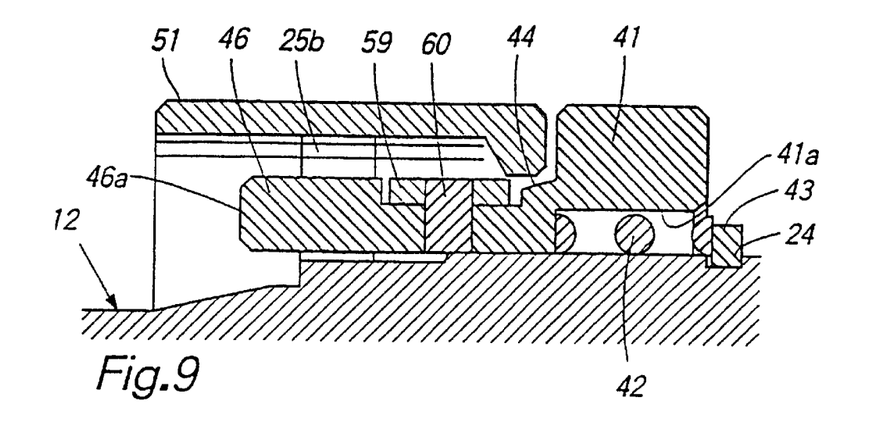
FIG. 9 is a partial sectional view cut along the line B—B of FIG. 4.
Figure 10:
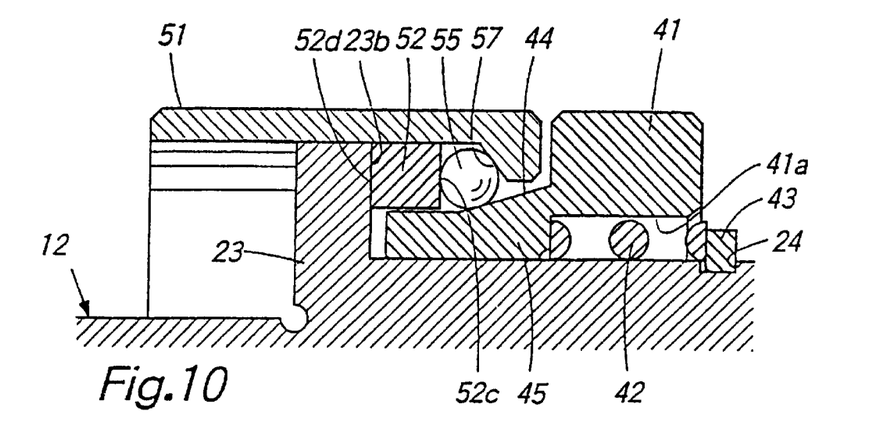
FIG. 10 is a partial sectional view cut along the line C—C of FIG. 4.

As shown in FIGS. 8, 9 and 10, a first operation ring 41 is axially slidably provided in front of the flange portion 23 of the holder main body 12. A circumferential groove 41a is formed in a fore portion of the inner circumferential surface of the first operation ring 41, and a compression spring 42 is disposed within the circumferential groove 41a. The compression spring 42 is positioned at its front portion by a stopper 43 fitted to the stopper groove 24, and the first operation ring 41 is urged rearward by the compression spring 42.

A taper portion 44 inwardly slanted, as viewed toward the rear, is formed so as to extend in the first operation ring 41, and a straight portion 45 is formed so as to extend in this taper portion 44. On both right and left sides in the rear of the straight portion 45, two drive key portions 46 are provided so as to pass through the deep cutouts 25b of the flange portion 23 and to fit to the key ways 11g of the spindle 11. When the fitting portion 21 of the holder main body 12 is fitted to the fitting hole 11a of the spindle 11, these drive key portions 46, if out of alignment with the key ways 11g, are pressed by the contact face 11e of the spindle 11 so as to be driven forward against the urging force of the compression spring 42. Also, the drive key portions 46, if aligned with the key ways 11g, are fitted to the key ways hg by righting force of the compression spring 42, so that the rotational force of the spindle 11 is transferred to the holder main body 12.

Behind the first operation ring 41, a second operation ring 51 is provided via spacers 52, 53. In the rear of the second operation ring 51, are provided upper-and-lower two engaging claws 54 to be engaged with the engaging portion 11d of the spindle 11. Upper-and-lower two fitting holes 56 to fit about a half of a first steel ball 55 are formed in a central portion of the inner surface of the second operation ring 51, while a taper portion 57 inwardly slanted, as viewed toward the front, is formed in a fore portion of the inner surface of the second operation ring 51.

The spacers 52, 53 are right-and-left symmetrical so as to form a ring shape to escape the width of the drive key portions 46 of the first operation ring 41. The spacers 52, 53 have protrusions 52a, 53a, respectively, which are fitted to the shallow cutouts 25a of the flange portion 23. On outer surfaces of the spacers 52, 53 in proximity to these protrusions 52a, 53a, are formed long grooves 52b, 53b, respectively, which fit about a half of the first steel ball 55. The long grooves 52b, 53b are directed so as to be longitudinally aligned with the axial direction, and the second operation ring 51 is axially movable within a range of the long grooves 52b, 53b. Also, the spacers 52, 53 are restricted in rotation by the protrusions 52a, 53a fitting to the cutouts 25a of the flange portion 23, while the second operation ring 51 is restricted in rotation by the first steel ball 55 fitting to the fitting holes 56.

In this connection, a multiplicity of second steel balls 58 are arrayed circularly between the taper portion 44 of the first operation ring 41, the taper portion 57 of the second operation ring 51 and front faces 52c, 53c of the spacers 52, 53. In order to prevent these steel balls 58 from escaping rearward from the cutouts 25b, a stopper 59 is fixed to the straight portion 45 of the first operation ring 41 by a spring pin 60. In addition, the second steel balls 58 may alternatively be roller-shaped, wedge-shaped, or the like only if radially movable. Further, the stopper 59 needs to be fixed so that the arrangement of the steel balls 58 will not be disordered by operation of the first operation ring 41.

With such a constitution, in the process of mounting the holder main body 12 on the spindle 11, with the second operation ring 51 gripped, the holder main body 12 is turned so as to allow the engaging claws 54 of the second operation ring 51 to be inserted into the key ways 11g, and the fitting portion 21 of the holder main body 12 is fitted to the fitting hole 11a of the spindle 11. As a result, the engaging claws 54 pass through the key ways 11g, entering into the annular groove 11c, so that rear faces 46a of the drive key portions 46 of the first operation ring 41 are pressed by the contact face 11e of the spindle 11, by which the first operation ring 41 slides forward while compressing the compression spring 42. In this state, turning the holder main body 12 by 90 degrees in any direction allows the drive key portions 46 of the first operation ring 41, after aligned with the key ways 11g, to be fitted to the key ways 11g by the righting force of the compression spring 42.

Figure 11:
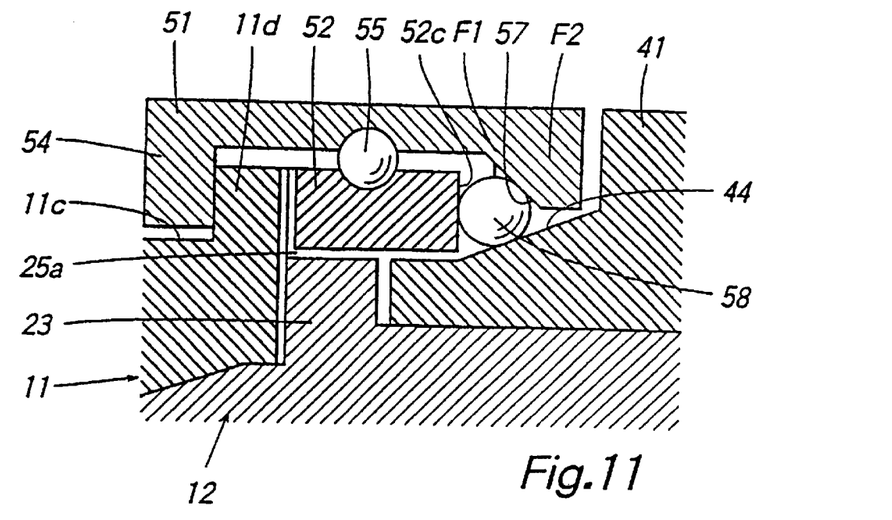
FIG. 11 is a functional explanatory view.

Moreover, as shown in FIG. 11, as the first operation ring 41 slides rearward, the second steel balls 58 go riding on the taper portion 44 so as to rush in between the taper portion 57 of the second operation ring 51 and the front faces 52c, 53c of the spacers 52, 53. As a result, the second operation ring 51 moves forward, while the spacers 52, 53 move rearward, so that the engaging claws 54 of the second operation ring 51 and the flange portion 23 of the holder main body 12 strongly pinch the engaging portion lid of the spindle 11. Then, when the holder main body 12 is turned, a radial centrifugal force F1 acts on the second steel balls 58 and its component force F2 presses the taper portion 57 further strongly, so that the flange portion 23 and the engaging claws 54 pinch the engaging portion lid with stronger force.

In the process of removing the holder main body 12 from the spindle 11, on the other hand, the drive key portions 46 of the first operation ring 41 are removed from the key ways 11g of the spindle 11 by forwardly sliding the first operation ring 41 against the compression spring 42, and then the holder main body 12 is turned by 90 degrees in any direction. As a result, the engaging claws 54 of the second operation ring 51 and the key ways 11g of the spindle 11 are aligned with each other, thus allowing the holder main body 12 to be drawn out of the spindle 11.

As shown above, since the holder main body 12 can be mounted on the spindle 11 only by pushing the holder main body 12 into the spindle 11 and turning the holder main body 12 by 90 degrees without using any special tool in the first embodiment, the mounting operation becomes easier to accomplish. Also, since the holder main body 12 is pushed into the spindle 11 by gripping the operation part 15, any damage due to the tool can be prevented.

Further, the second steel balls 58 are arranged between the taper portion 44 of the first operation ring 41, the taper portion 57 of the second operation ring 51, and the front faces 52c, 53c of the spacers 52, 53, and moreover the steel balls 58 are pressed outward by the urging force of the compression spring 42. Therefore, by forwardly pressing the second operation ring 51 while rearwardly pressing the spacers 52, 52, the engaging portion lid of the spindle 11 can be strongly pinched by the engaging claws 54 of the second operation ring 51 and the flange portion 23 of the holder main body 12. Thus, the holder main body 12 can be firmly mounted on the spindle 11.

Furthermore, as the holder main body 12 is turned, the second steel balls 58 come to press the second operation ring 51 and the spacers 52, 53 more strongly by centrifugal force, so that the holder main body 12 can be mounted on the spindle 11 more firmly. In this connection, the arrangement of a multiplicity of second steel balls 58 makes it possible to reduce the load applied on each one second steel ball 58, so that pressure impressions can be prevented from occurring to the taper portion 44 and the taper portion 57.

Accordingly, in this first embodiment, since the holder main body 12 can be firmly mounted on the spindle 11, a stable dimensional precision in the axial direction can be attained while occurrence of high-frequency vibrations can be prevented, making it possible to prevent the spindle 11 and the holder main body 12 from wearout and the like. Also, it is enabled to prevent machining faults, improve the life of the tool and reduce the maintenance time, which contributes to a reduction in cost. Furthermore, high-speed rotation is available, enabling an improvement in machining efficiency.

Further, changing the slant angles of the taper portion 44 of the first operation ring 41 and the taper portion 57 of the second operation ring 51 makes it possible to obtain a several times higher fitting load of the holder main body 12 to the spindle 11 than the set load of the compression spring 42. Conversely, even when tensile force is applied to the holder main body 12, the load applied to the compression spring 42 can be saved to only a fraction of it, so that the withstand tensile force can be enhanced.

Figure 12:
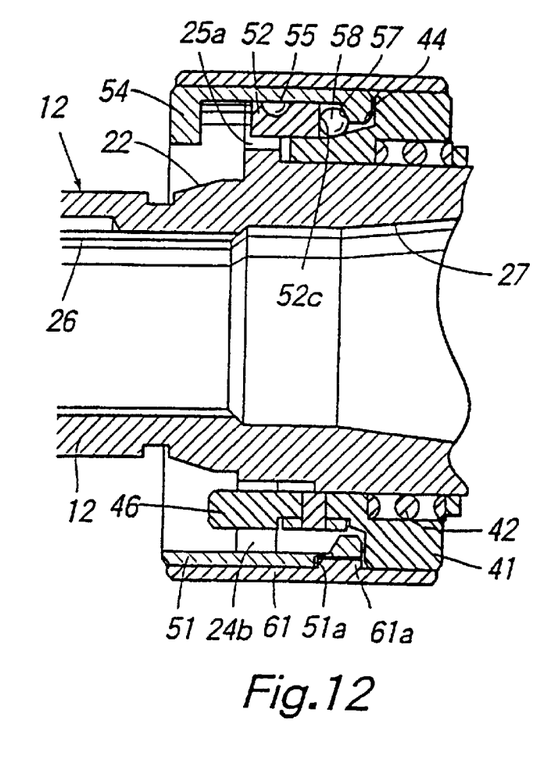
FIG. 12 is a sectional view of main part of a second embodiment.
Figure 13:
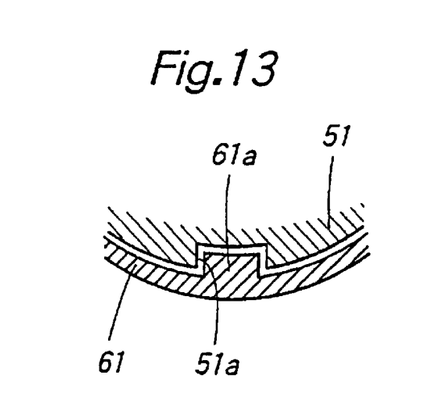
FIG. 13 is a partly enlarged view.

FIG. 12 is a sectional view of main part of a second embodiment, where a third operation ring 61 is provided on the outer surfaces of a first operation ring 41 and a second operation ring 51 similar to those of the first embodiment. Also, as shown in FIG. 13, key ways 5a are formed in a fore portion of the outer surface of the second operation ring 51 so as to be axially directed and opened to the rear edge, and a key portion 61a to be fitted to the key ways 51a of the second operation ring 51 is formed in the inner surface of the third operation ring 61. Then, the third operation ring 61 is restricted in the direction of rotation by the size of the key ways 51a and the key 61a, and restricted in the direction of axis by the length of the key ways 51a and the key 61a.

In this second embodiment, not only the same effects as those of the first embodiment can be obtained, but also the first operation ring 41 can be operated by forwardly sliding the third operation ring 61. Thus, the first operation ring 41 and the second operation ring 51 can be operated with a single member.

In addition, although a cutout 35 has been provided in the sliding member 35 of the tool-length adjusting part 14 in the first and second embodiments, the cutout 35a do not need to be provided when a drill having no detent is used. Also, although the stopper 59 has been fixed to the first operation ring 41 by the spring pin 60, forming the first operation ring 41 by a miller or the like allows the stopper 59 to be formed integrally, in which case the stopper 59 and the pin 60 as separate members are no longer necessary.

Furthermore, the above description has been made on the case where the spindle 11 is of the straight type as in multi-spindle machines. Providing a taper shunk at the rear end of the holder main body 12 enables adaptation to machining centers.

INDUSTRIAL APPLICABILITY

The tool attaching/detaching device according to the present invention allows the holder main body to be attached to and detached from the machine spindle by gripping the second operation ring. Thus, operation of the device can be carried out easily. Also, since the holder main body is pushed into the machine spindle by gripping the second operation ring, any damage due to the tool can be prevented.

Further, when the first operation ring has been slid rearward by the urging force of the urging means, the first operation ring presses the rolling member outward and the rolling member in turn presses the spacers rearward and besides presses the second operation ring forward. Thus, the holder main body can be mounted on the machine spindle firmly.

Furthermore, by the centrifugal force of the rolling member due to the turning of the holder main body, the rolling member presses the spacers rearward more strongly and besides presses the second operation ring forward more strongly. Thus, the holder main body can be mounted on the spindle more firmly.

I claim:

1. A tool attaching/detaching device comprising: a holder main body for holding a tool in a fore portion thereof and fitting to a fitting hole in a rear portion thereof, with a flange portion formed in an intermediate portion thereof; a first operation ring slidably provided on an outer circumference in front of the flange portion; a second operation ring provided on an outer circumference of the first operation ring via a spacer and having an engaging claw to be engaged with an engaging portion of a machine spindle; and urging means for urging the first operation ring rearward, the tool attaching/detaching device being characterized in that: the flange portion has upper-and-lower cutouts and right-and-left cutouts formed therein; a first taper portion inwardly slanted, as viewed toward the rear, is provided in a rear portion of the first operation ring; a key portion to be fitted to a key way of the machine spindle by passing through the right-and-left cutouts is provided in a rear portion of the first taper portion; a front face generally perpendicular to an axial direction is provided in a fore portion of the spacer while protrusions to be fitted to the upper-and-lower cutouts are provided in a rear portion of the spacer; a second taper portion inwardly slanted, as viewed toward the front, is provided in a fore portion of an inner surface of the second operation ring; and a multiplicity of rolling members are arranged between the first taper portion of the first operation ring, the front face of the spacer and the second taper portion of the second operation ring.

2. The tool attaching/detaching device according to claim 1, wherein the upper-and-lower cutouts and the right-and-left cutouts differ in depth from each other.

3. The tool attaching/detaching device according to claim 1 wherein the spacer is provided integrally or separately with a stopper portion for restricting the rolling members from escaping out from the right-and-left cutouts.

4. The tool attaching/detaching device according to claim 1, wherein an engaging force of the engaging claw of the second operation ring is adjusted by changing a slant angle of the first taper portion of the first operation ring, a slant angle of the second taper portion of the second operation ring and an urging force of the urging means.

5. The tool attaching/detaching device according to claim 1 further comprising a third operation ring provided on an outer circumference of the second operation ring, wherein a key way is formed in an outer surface of the second operation ring so as to be directed axially and opened to a rear edge, and a key portion to be fitted to the key way is provided in an outer surface of the third operation ring.

6. The tool attaching/detaching device according to claim 2, wherein the spacer is provided integrally or separately with a stopper portion for restricting the rolling members from escaping out from the right-and-left cutouts.

7. The tool attaching/detaching device according to claim 2, wherein an engaging force of the engaging claw of the second operation ring is adjusted by changing a slant angle of the second taper portion of the second operation ring and an urging force of the urging means.

8. The tool attaching/detaching device according to claim 3, wherein an engaging force of the engaging claw of the second operation ring is adjusted by changing a slant angle of the first taper portion of the first operation ring, a slant angle of the second taper portion of the second operation ring and an urging force of the urging means.

9. The tool attaching/detaching device according to claim 6, wherein an engaging force of the engaging claw of the second operation ring is adjusted by changing a slant angle of the first taper portion of the first operation ring, a slant angle of the second taper portion of the second operation ring and an urging force of the urging means.

10. The tool attaching/detaching device according to claim 2, further comprising a third operation ring provided on an outer circumference of the second operation ring, wherein a key way is formed in an outer surface of the second operation ring so as to be directed axially and opened to a rear edge, and a key portion to be fitted to the key way is provided in an outer surface of the third operation ring.

11. The tool attaching/detaching device according to claim 3, further comprising a third operation ring provided on an outer circumference of the second operation ring, wherein a key way is formed in an outer surface of the second operation ring so as to be directed axially and opened to a rear edge, and a key portion to be fitted to the key way is provided in an outer surface of the third operation ring.

12. The tool attaching/detaching device according to claim 4, further comprising a third operation ring provided on an outer circumference of the second operation ring, wherein a key way is formed in an outer surface of the second operation ring so as to be directed axially and opened to a rear edge, and a key portion to be fitted to the key way is provided in an outer surface of the third operation ring.

13. The tool attaching/detaching device according to claim 6, further comprising a third operation ring provided on an outer circumference of the second operation ring, wherein a key way is formed in an outer surface of the second operation ring so as to be directed axially and opened to a rear edge, and a key portion to be fitted to the key way is provided in an outer surface of the third operation ring.

14. The tool attaching/detaching device according to claim 9, further comprising a third operation ring provided on an outer circumference of the second operation ring, wherein a key way is formed in an outer surface of the second operation ring so as to be directed axially and opened to a rear edge, and a key portion to be fitted to the key way is provided in an outer surface of the third operation ring.

* * * * *